(12) United States Patent
Reed et al.

(10) Patent No.: X1228
(45) Date of Patent: Mar. 8, 1810

(54) NAILS, CUTTING

(76) Inventors: Reed; Briggs; Rogers

2—328 a.

DRAFTSMAN'S DIVISION.
*All communications should be addressed to "The Commissioner of Patents, Washington, D. C."*

*DEPARTMENT OF THE INTERIOR,*

United States Patent Office.

*Washington, D. C.,* ............................................, *189*..

*SIR:*

*The printed* copies *of Patent No.* B R Reid Mar 8, 1810 are *exhausted.*

*As soon as reprinted a copy will be mailed you to complete your order.*

*By direction of the Commissioner:*

*Very respectfully,*

*Chief Clerk.*

3143b6-97-5m